(12) United States Patent
Vasseur et al.

(10) Patent No.: US 8,068,411 B2
(45) Date of Patent: Nov. 29, 2011

(54) METHOD AND APPARATUS TO COMPUTE LOCAL REPAIR PATHS TAKING INTO ACCOUNT LINK RESOURCES AND ATTRIBUTES

(75) Inventors: Jean-Philippe Vasseur, Dunstable, MA (US); Stefano B. Previdi, Rome (IT); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1172 days.

(21) Appl. No.: 11/025,179

(22) Filed: Dec. 29, 2004

(65) Prior Publication Data

US 2006/0140111 A1    Jun. 29, 2006

(51) Int. Cl.
*H04J 1/16* (2006.01)
*H04L 1/00* (2006.01)

(52) U.S. Cl. .................. 370/227; 370/217; 370/252

(58) Field of Classification Search .............. 370/389, 370/248, 238, 237, 392, 254, 225, 227, 217, 370/252, 242, 216–228, 351, 395.21; 709/223
See application file for complete search history.

(56) References Cited

U.S. PATENT DOCUMENTS

| | | | |
|---|---|---|---|
| 6,363,319 B1 * | 3/2002 | Hsu | 701/202 |
| 6,370,119 B1 | 4/2002 | Basso et al. | |
| 6,757,258 B1 | 6/2004 | Pillay-Esnault | |
| 6,765,880 B1 | 7/2004 | Hillard et al. | |
| 6,820,134 B1 | 11/2004 | Zinin et al. | |
| 6,956,821 B2 * | 10/2005 | Szviatovszki et al. | 370/237 |
| 7,124,187 B1 * | 10/2006 | Kodialam et al. | 709/226 |
| 7,184,434 B2 * | 2/2007 | Ganti et al. | 370/389 |
| 7,451,340 B2 * | 11/2008 | Doshi et al. | 714/4 |
| 7,457,233 B1 * | 11/2008 | Gan et al. | 370/216 |
| 7,545,736 B2 * | 6/2009 | Dziong et al. | 370/217 |
| 7,689,693 B2 * | 3/2010 | Doshi et al. | 709/226 |
| 2002/0141345 A1 * | 10/2002 | Szviatovszki et al. | 370/238 |
| 2003/0147352 A1 * | 8/2003 | Ishibashi et al. | 370/248 |
| 2004/0042406 A1 * | 3/2004 | Wu et al. | 370/238 |
| 2004/0190445 A1 * | 9/2004 | Dziong et al. | 370/225 |
| 2004/0193728 A1 * | 9/2004 | Doshi et al. | 709/238 |
| 2004/0205237 A1 * | 10/2004 | Doshi et al. | 709/241 |

(Continued)

OTHER PUBLICATIONS

Vasseur, Jean-Phillipe et al., Internet Draft entitled "Definition of an IS-IS Link Attribute Sub-TLV" (draft-vasseur-isis-link-attr-01.txt), Jul. 2004.

(Continued)

*Primary Examiner* — Chuong T Ho
(74) *Attorney, Agent, or Firm* — Cesari and McKenna, LLP (57) ABSTRACT

A technique for calculating local repair paths through a computer network using one or more dynamically measured parameters in place of, or in addition to, statically assigned cost metrics. The dynamically measured parameters include various statistical measures of resources and attributes associated with data links and/or network nodes in the computer network. In operation, an intermediate node monitors a set of local link and/or node parameters. The node may generate an advertisement in response to at least one of its monitored parameters crossing a predetermined threshold value or changing value by a predetermined percentage or amount. The advertisement is "flooded" so as to advertise the dynamically measured parameter value to other neighboring intermediate nodes. After receiving the advertisement, each node may recalculate one or more local repair paths based on the advertised parameter value. The node may utilize a recalculated repair path if it provides an appreciably lower-cost path, e.g., by a predetermined percentage, as compared with the currently deployed repair path.

11 Claims, 7 Drawing Sheets

U.S. PATENT DOCUMENTS

| | | | |
|---|---|---|---|
| 2004/0205238 A1* | 10/2004 | Doshi et al. | 709/241 |
| 2004/0205239 A1* | 10/2004 | Doshi et al. | 709/241 |
| 2005/0008014 A1* | 1/2005 | Mitra et al. | 370/392 |
| 2005/0190704 A1* | 9/2005 | Zhang et al. | 370/254 |
| 2006/0007865 A1* | 1/2006 | White et al. | 370/238 |
| 2007/0011284 A1* | 1/2007 | Le Roux et al. | 709/223 |

OTHER PUBLICATIONS

Smit, H et al., RFC 3784 entitled "Intermediate System to Intermediate System (IS-IS) Extensions for Traffic Engineering (TE)", Jun. 2004.

Pan, Ping et al., Internet Draft entitled "Fast Reroute Extensions to RSVP-TE for LSP Tunnels" (draft-ietf-mpls-rsvp-lsp-fastereroute-07.txt), Feb. 2005.

Perlman, Radia, Interconnections Second Edition: Bridges, Routers, Switches, and Internetworking Protocols, Section 12.2.4, pp. 317-319, Jan. 2000.

Oran, David, RFC 1142 entitled "OSI IS-IS Intra-domain Routing Protocol", Feb. 1990.

Moy, J., RFC 2328 entitled "OSPF Version 2", Apr. 1998.

* cited by examiner

METHOD AND APPARATUS TO COMPUTE LOCAL REPAIR PATHS TAKING INTO ACCOUNT LINK RESOURCES AND ATTRIBUTES

FIELD OF THE INVENTION

This invention relates generally to network traffic engineering, and, more specifically, to an improved method and apparatus for calculating local repair paths using dynamically acquired measurements in a computer network.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. The network topology is defined by an arrangement of inter-connected network nodes that communicate with one another, typically through one or more intermediate nodes, such as routers and switches. Adjacent ("neighboring") network nodes may be interconnected by various types of data links, such as conventional wire links, optical links, wireless links, etc. The network nodes typically communicate by exchanging discrete packets of data over the data link using predefined network communication protocols. In this context, a protocol consists of a set of rules defining how network nodes interact with each other.

A computer network may contain smaller groups of one or more subnetworks which may be managed as separate routing areas. As used herein, a routing area is broadly construed as a collection of interconnected network nodes under a common administration. Accordingly, a routing area also may be generally referred to as a routing domain or routing level. A routing area may operate as an enterprise network, a service provider or any other type of network or subnetwork. Often, a routing area is managed by a single administrative entity, such as a company, an academic institution or a branch of government. Such a centrally-managed routing area is sometimes referred to as an "autonomous system" (AS).

Network nodes in a routing area are typically configured to forward data using "interior gateway" routing protocols. These interior gateway protocols (IGP) define the manner with which routing information and network-topology information is exchanged and processed in the routing area. For instance, IGP protocols typically provide a mechanism for distributing network address information corresponding to a set of nodes and subnetworks that are reachable (i.e., accessible) to intermediate nodes in the routing area. As such, each intermediate node receives a consistent "view" of the routing area's topology. Examples of interior gateway routing protocols include conventional link-state protocols, such as the Open Shortest Path First (OSPF) protocol and the Intermediate-System-to-Intermediate-System (IS-IS) protocol. The OSPF and IS-IS protocols are described in more detail in the Internet Engineering Task Force (IETF) publications Request for Comments (RFC) 2328, entitled "OSPF Version 2," published April 1998 and RFC 1142, entitled "OSI IS-IS Intra-domain Routing Protocol," published February 1990, both of which are hereby incorporated by reference as though fully set forth herein.

Conventional link-state protocols, such as OSPF and IS-IS, use IGP advertisements for exchanging routing information between interconnected intermediate network nodes (IGP nodes) in a routing area. As used herein, an IGP advertisement describes any message used by an IGP routing protocol to communicate routing information and/or network-topology information among the interconnected IGP nodes. An IGP node typically generates an IGP advertisement in response to a network event, such as a detected node or link failure, and in some cases may generate its IGP advertisements periodically. Operationally, a first IGP node may generate an IGP advertisement and then "flood" (i.e., transmit) the advertisement to each of its directly-connected IGP nodes (neighboring IGP nodes). Thereafter, a neighboring IGP node receives the flooded advertisement and updates its local set of routing information based on the contents of the received advertisement. Next, the neighboring IGP node may flood the received IGP advertisement to each of its directly-connected IGP nodes, except for the node which previously flooded the advertisement. This process may be repeated until each IGP node in the routing area has received the advertisement and updated its local routing information.

Each IGP node typically generates and disseminates an IGP advertisement that identifies each of the IGP node's neighboring network nodes. In addition, the advertisement also contains one or more "cost" values for each of the neighboring nodes identified in the advertisement. As used herein, a cost value associated with a neighboring node is an arbitrary metric used to determine the relative ease/burden of communicating with that node. The cost values may correspond to various parameters and attributes associated with the neighboring node or with the data link coupled to the node. For example, the cost values may indicate, among other things, a relative preference assigned to the neighboring node, the maximum available bandwidth over a data link coupled to the node, a minimum round-trip time required to communicate with the node, a relative reliability or quality-of-service (QoS) metric associated with the node, etc. In practice, the cost values associated with a link or node are manually assigned, e.g., by a system administrator, and are therefore static in the sense that they do not change values over time.

As noted, IGP advertisements are usually flooded until each IGP node has received an IGP advertisement from each of the other interconnected IGP nodes in the routing area. Furthermore, IGP advertisements are refreshed when a specific timer expires. Then, each of the IGP nodes can construct the same "view" of the network topology by aggregating the received lists of neighboring nodes and cost values. Specifically, each IGP node may input this received routing information to a "shortest path first" (SPF) calculation that determines the lowest-cost network paths that couple the IGP node with each of the other network nodes in the routing area. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein.

An IGP node may be configured to "protect" network traffic over a given data link or node by providing a repair path (backup path) that circumvents the protected link or node in the event of certain network failures. For instance, in response to identifying that the protected node or data link has become inaccessible or otherwise inoperative, the node immediately upstream to the failed network element (e.g., link or node) may reroute network traffic normally transiting through the failed network element via the repair path. As such, the IGP node does not "drop" received data packets as a result of the network failure. The repair path may be deployed as a fast reroute (FRR) data path, e.g., using Multi-Protocol Label Switching (MPLS) or Internet Protocol (IP) FRR techniques.

Examples of MPLS FRR repair paths are described in the IETF Internet *Draft draft-ietf-mpls-rsvp-lsp-fastreroute-07.txt*, entitled "Fast Reroute Extensions to RSVP-TE for LSP tunnels," by Pan et al., expiring on February 2005, which is hereby incorporated by reference in its entirety.

The constraint-based SPF (CSPF) algorithm is often used for calculating local repair paths in a routing area. The CSPF algorithm employs conventional SPF calculations subject to a predetermined set of constraints. Broadly stated, the algorithm "prunes" the network topology information input to the SPF calculations so as to remove any links and/or nodes that do not satisfy the set of constraints. First, the algorithm removes the link or node being protected to ensure that the calculated repair path will not include the protected link or node. In the case of a protected data link, any other links that are members of the same shared risk link group (SRLG) as the protected link are also removed from the network topology information input to the CSPF calculations. Next, any data link or network node that fails to satisfy the predetermined set of constraints is excluded from the CSPF calculations. After removing ineligible links and nodes in this manner, the resultant constrained network topology is input to the CSPF calculations. The result of the CSPF calculations is a constrained shortest path that may be used to select a lowest-cost local repair path for the protected node or link.

The predetermined set of constraints used for CSPF calculations are based on statically-configured cost metrics that are typically distributed using IGP protocols. The cost metrics used in the CSPF calculations generally include traditional IGP cost values as well as other statically-configured node and link attributes and parameters, such as link affinities (i.e., administrative attributes assigned to a node or link). For example, the set of constraints may be configured to exclude from the CSPF calculations any nodes and/or data links whose associated cost metrics do not fall within predetermined ranges of cost-metric values. For instance, such a constraint may specify that nodes and data links that support, e.g., a reservable bandwidth below a specified minimum bandwidth should be excluded from the CSPF calculations.

Because CSPF constraints are based on statically-configured cost metrics, the local repair paths derived from the CSPF algorithm may not actually reflect the lowest cost repair paths in the routing area. That is, if the static cost metrics become "out of date" due to changes in the network, then the local repair paths calculated using the CSPF algorithm may not be accurate. There is generally a need to take into account various changes in the network topology when calculating local repair paths to ensure that an IGP node selects the most optimal repair path available for a protected node or link.

SUMMARY OF THE INVENTION

The present invention overcomes the disadvantages of the prior art by providing a technique for calculating local repair paths through a computer network using one or more dynamically measured parameters in place of, or in addition to, statically assigned cost metrics. As such, the local repair paths are calculated based on a more accurate ("up to date") view of the network topology as compared with conventional repair path calculations. The dynamically measured parameters include various statistical measures of resources and attributes associated with links and/or nodes in the computer network. Such parameters may include, for example, link throughput measurements, packet counters, bandwidth utilization measurements, interface reset counters, and so forth. In operation, an intermediate node monitors a set of local link and/or node parameters. Unlike previous implementations, the node may generate an advertisement in response to at least one of the monitored parameters crossing a predetermined threshold value or changing value by a predetermined percentage or amount. The advertisement is "flooded" so as to advertise the dynamically measured parameter value to other neighboring intermediate nodes (neighbors). After receiving the advertisement, each neighbor may recalculate one or more local repair paths based on the advertised parameter value. The neighbor may utilize a recalculated repair path if it provides an appreciably lower-cost path, e.g., by a predetermined percentage, as compared with the currently deployed repair path.

In accordance with an illustrative embodiment, the present invention is implemented in an Intermediate-System-to-Intermediate-System (IS-IS) network using advertisements embodied as link state packets (LSP). An Extended IS Reachability type-length-value (TLV) tuple of the LSP is extended to store dynamically measured link and/or node parameters. Specifically, the dynamically measured parameters may be stored in one or more novel sub-TLVs within the Extended IS Reachability TLV. The dynamically measured parameters are thereafter used as input metrics when calculating local repair paths in accordance with, e.g., constraint-based shortest path first (CSPF) calculations.

Advantageously, the present invention optimizes local repair path calculations by taking into account dynamic measurements of link parameters that more accurately reflect the current state of the network. The invention may be used to compute optimized repair paths in accordance with various fast reroute (FRR) mechanisms, such as Multi-Protocol Label Switching (MPLS) or Internet Protocol (IP) FRR mechanisms. Although the invention is illustratively deployed in an IS-IS network, the invention is more generally compatible with any interior gateway routing protocol and does not depend on any particular network topology.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1A:
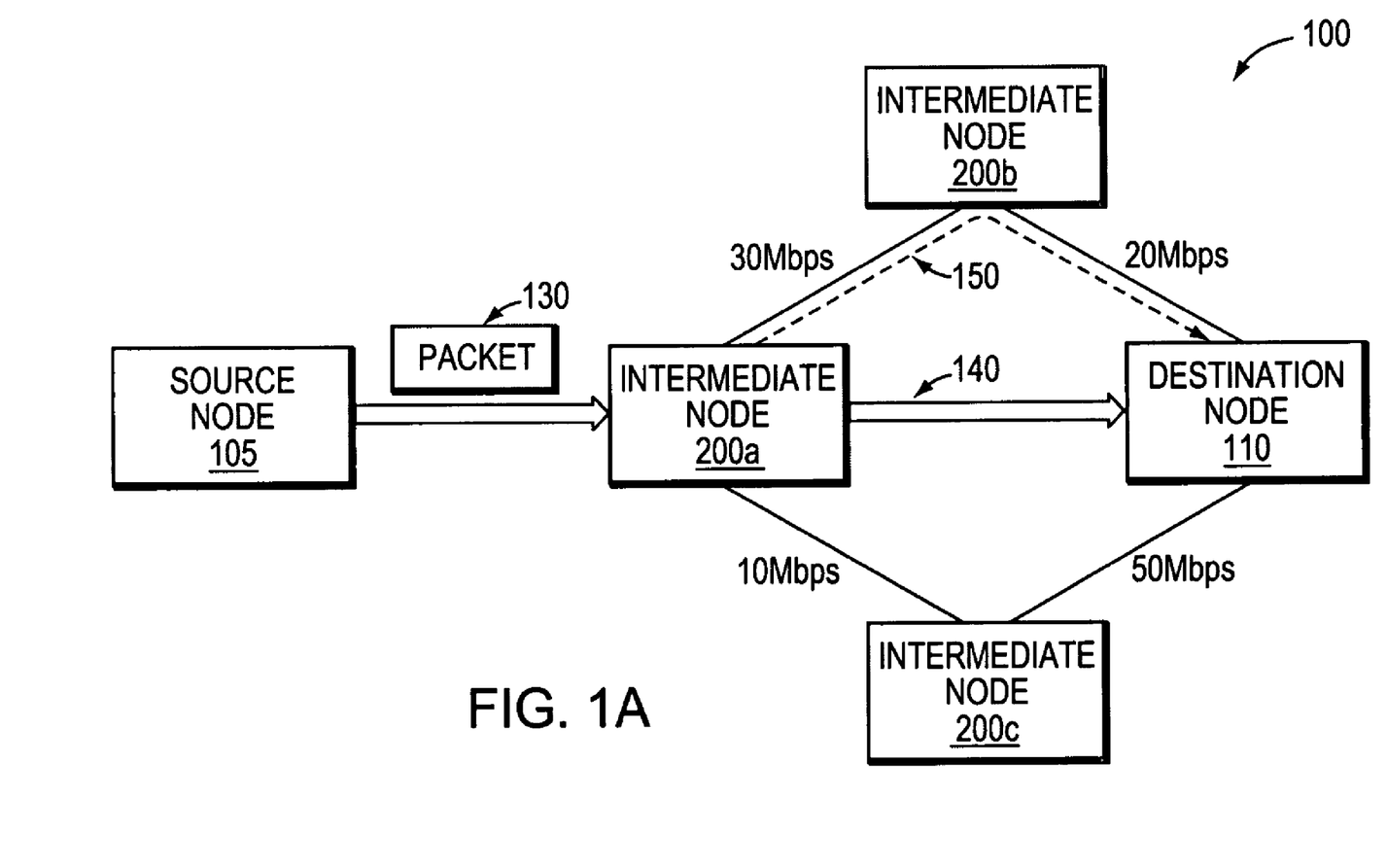
FIGS. 1A-B are schematic block diagrams of an exemplary network topology in which local repair paths may be selected in response to dynamically measured node and/or link parameters.

FIG. 1A illustrates an exemplary routing area 100 (or a portion thereof) comprising a plurality of network nodes. The routing area may be a routing domain, or routing "level," configured to implement an interior gateway routing protocol (IGP). The routing area includes a source node 105 that transmits data packets 130 to a destination node 110. The packets traverse a logical data path 140 (shown in bold), which in this case includes the intermediate node 200*a*. Specifically, the source node 105 forwards a packet 130 to the intermediate node 200*a* which, in turn, then forwards the packet to the destination node 110.

The intermediate node 200*a* may be configured to identify a local repair path (backup path) that "protects" network traffic between the intermediate node 200*a* and the destination node 110. The intermediate node 200*a* may redirect packets 130 over the local repair path in response to, e.g., a data link failure between the intermediate node 200*a* and the destination node 110 or any other network failure that renders the destination node inaccessible. For ease of description and understanding, only link failure protection is illustratively described herein, although the principles of the invention apply equally to node failure protection. As shown in the exemplary network topology, the intermediate node 200*a* may select between two possible repair paths in response to a failed data link between the intermediate node 200*a* and the destination node 110: a first repair path from intermediate node 200*a* to an intermediate node 200*b* to the destination node 110 and a second repair path from the intermediate node 200*a* via intermediate node 200*c* to destination node 110. The intermediate node 200*a* preferably selects one of these repair paths based on the output of a constraint-based shortest path first (CSPF) algorithm.

In accordance with an illustrative embodiment, the intermediate node 200*a* performs its CSPF calculations using dynamically measured node and/or link parameters in place of, or in addition to, conventional statically-assigned cost metrics. These parameters are measured by one or more intermediate nodes in the routing area 100, e.g., periodically or in response to selected network events. The dynamically measured parameters include various statistical measures of resources and attributes associated with links and/or nodes in the routing area. Such parameters may include, for example, bandwidth utilization measurements (e.g., percent of available bandwidth utilized over a data link), packet counters (e.g., packet-error counters, dropped-packet counters, received-packet counters, etc.), link throughput measurements (e.g., bits per second, total bytes, average bits per second over a specified time window, etc.), network-interface reset counters, etc.

The intermediate node 200*a* excludes from its CSPF calculations any nodes and/or data links whose dynamically measured parameters do not satisfy a predetermined set of constraints. For example, the constraints may exclude any nodes or links that are considered over-utilized or whose inclusion in a repair path could cause resource starvation in other nodes or links. The intermediate node 200*a* generates one or more constrained shortest paths from its CSPF calculations. Such shortest paths identify the "lowest-cost" repair paths satisfying the predetermined set of constraints. In this context, the cost of a repair path may be derived using an arbitrary function of dynamically measured parameters and statically configured cost metrics associated with nodes and links in the repair path. Therefore, the constrained shortest paths may identify lowest-cost repair paths based on those repair paths having the lowest total cost values or the lowest average cost values, etc. over their constituent nodes and data links.

For purposes of description, assume that each of the intermediate nodes 200*a-c* dynamically measures network bandwidth utilization over its interconnected data links. In this example, the intermediate node 200*a* may determine from its measurements that 30 Megabits per second (Mbps) is currently being consumed over its data link connected to the intermediate node 200*b* and 10 Mbps is being utilized over its link to the intermediate node 200*c*. Likewise, the intermediate nodes 200*b* and 200*c* may measure bandwidth utilizations of 20 Mbps and 50 Mbps over their respective data links connected to the destination node 110. Although each intermediate node in this example measures bandwidth utilization over its interconnected links, those skilled in the art will appreciate that other dynamic measurements, such as average link utilization percentages, may be measured in place of, or in addition to, the illustrated bandwidth utilization measurements. The intermediate nodes 200*a-c* disseminate their dynamically acquired bandwidth utilization measurements, e.g., using an interior gateway routing protocol advertisement, such as an Open Shortest Path First (OSPF) advertisement or an Intermediate-System-to-Intermediate-System (IS-IS) advertisement.

As noted, the intermediate node 200*a* performs CSPF calculations to identify a lowest-cost repair path satisfying a predetermined set of constraints. Now assume that the intermediate node 200*a* implements a constraint that excludes from its CSPF calculations any data links having a measured bandwidth utilization greater than 40 Mbps (because such links would be considered congested, supposing for the sake of illustration that all links have the same capacity; another example could consist of a constraint that excludes data links based on, e.g., measurements of the links' average link utilization percentages). In this case, the data link having a bandwidth utilization of 50 Mbps, situated between the intermediate node 200*c* and the destination node 110, is excluded for failing to satisfy the above-noted constraint. As a result, the local repair path 150 becomes the only possible repair path that satisfies the CSPF constraint, and thus the intermediate node 200*a* redirects data packets 130 addressed to the destination node 110 over the repair path 150 in the event that the destination node becomes inaccessible, e.g., due to node or link failure (a link failure in this example).

Further to the illustrative embodiment, an intermediate node may generate an IGP advertisement in response to at least one of its dynamically measured parameters crossing a predetermined threshold value or changing value by a predetermined percentage or amount. The IGP advertisement is "flooded" so as to advertise the dynamically measured parameter value to other neighboring intermediate nodes (neighbors). After receiving the advertisement, each neighbor may recalculate one or more local repair paths based on the advertised parameter value. The neighbor may utilize a recalculated repair path if it provides an appreciably lower cost path, e.g., by a predetermined percentage, versus the currently deployed repair path.

Figure 1B:
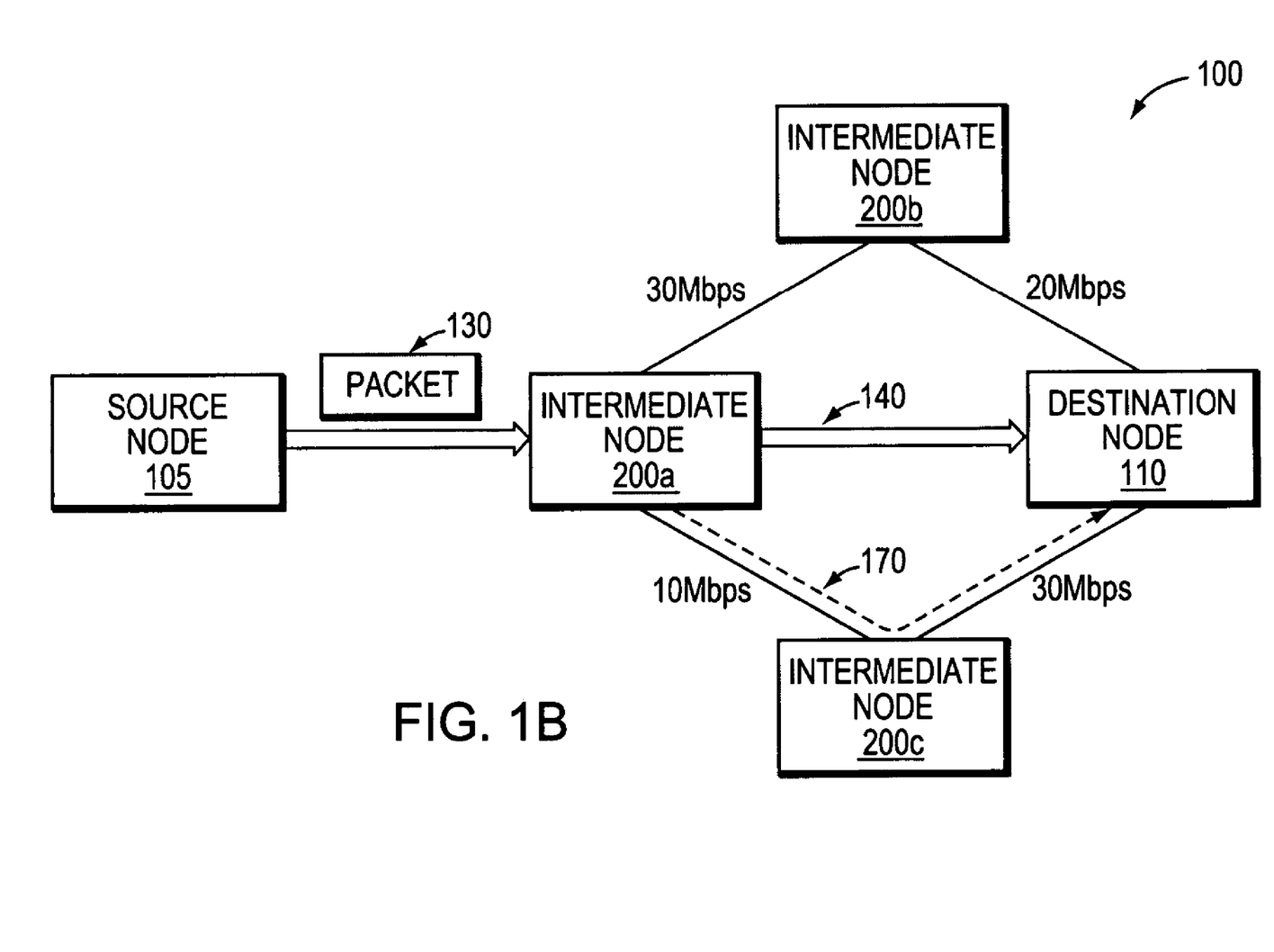

For instance, in FIG. 1B, suppose the intermediate node 200*c* updates the bandwidth utilization measurement over its data link connected to the destination node 110, and the new measurement indicates that the link's bandwidth utilization has decreased from 50 Mbps to 30 Mbps. Next, assume that the intermediate node 200*c* is configured to notify the other intermediate nodes 200a and 200b of the updated bandwidth utilization measurement if the updated measurement increases or decreases in value by 10 percent or more. In this hypothetical case, because the measured value decreased by 40 percent, the intermediate node 200c transmits (or "floods") an IGP advertisement containing the updated bandwidth utilization measurement to inform the other intermediate nodes 200a and 200b of the change.

In response to receiving this IGP advertisement, the intermediate node 200a recalculates a new constrained shorted repair path by triggering CSPF calculation using the intermediate node 200c's updated bandwidth utilization measurement. Unlike in FIG. 1A, none of the data links in the topology of FIG. 1B is excluded by the intermediate node 200a's constraint that only data links having bandwidth utilizations less than 40 Mbps are permitted to be input to the CSPF algorithm. Accordingly, the intermediate node 200a computes a constrained shortest path containing a lower-cost local repair path 170 (40 Mbps) as compared with the existing repair path 150 (50 Mbps). Here, it is assumed that the CSPF algorithm determines the relative cost of a repair path as the sum of the bandwidth utilization measurements over that repair path. Of course, the algorithm alternatively may employ other functions for determining the lowest-cost repair path in other embodiments.

The intermediate node 200a may be configured to deploy the newly-calculated repair path 170 only if the path is associated with a sufficiently lower cost as compared with the existing repair path 150. That is, the intermediate node 200a may be configured to "accept" the newly-computed local repair path 170, thereby replacing the repair path 150, if the repair path 170 is associated with a cost that is less than the existing repair path's cost by a predetermined percentage or amount. For example, assume the intermediate node 200a is configured to utilize a local repair path only if it provides at least a 10 percent reduction in cost value. In this example, the repair path 170 (40 Mbps) provides a 20 percent decrease in cost as compared with the repair path 150 (50 Mbps) and is therefore deployed to protect network traffic over the data link between the intermediate node 200a and the destination node 110.

Figure 2:
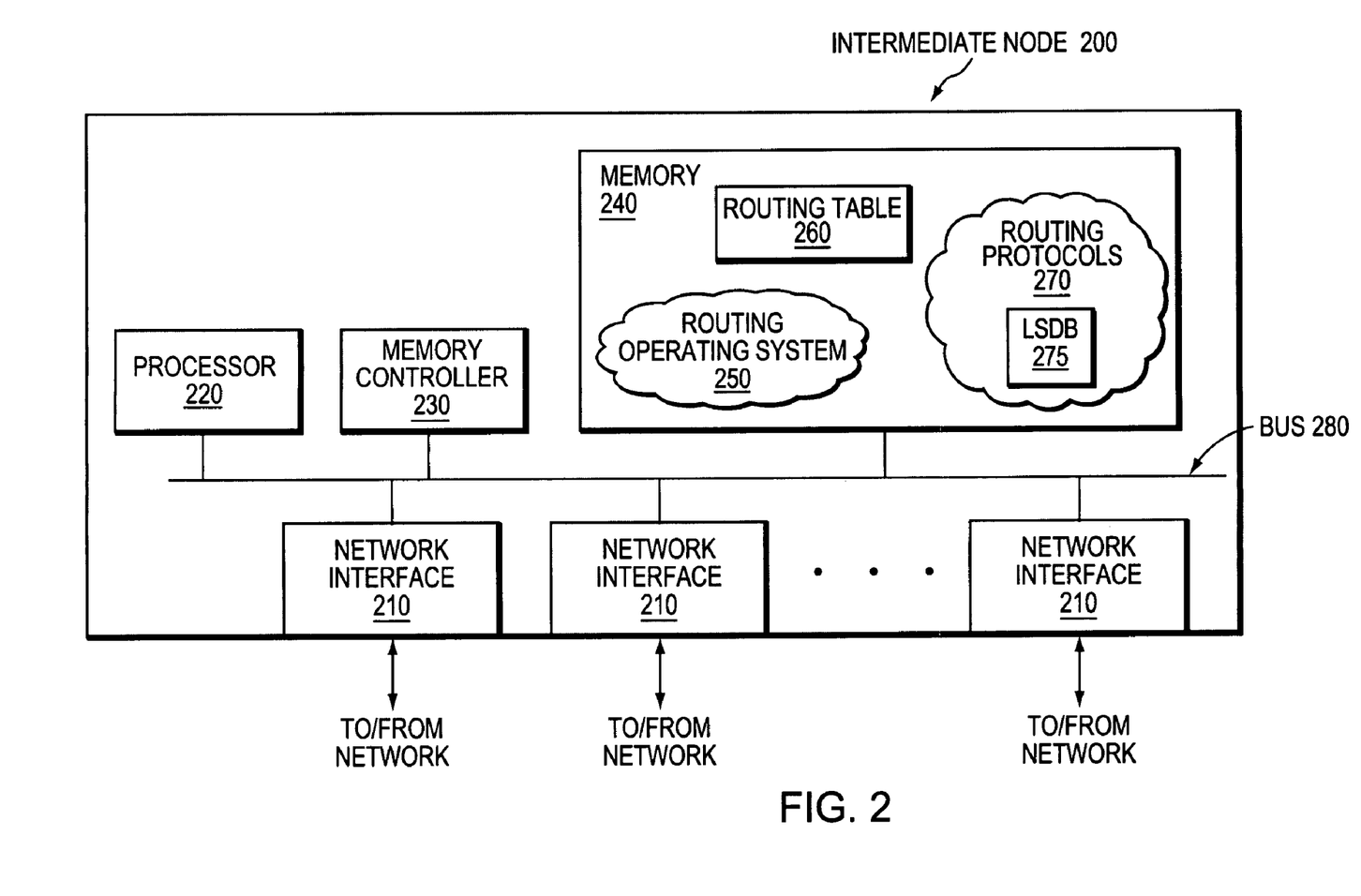
FIG. 2 is a schematic block diagram of an illustrative intermediate node that may deployed in the network topology of FIGS. 1A-B.

FIG. 2 is a schematic block diagram of an exemplary intermediate node 200, such as a router, that may be advantageously used with the illustrative embodiment. Suitable intermediate nodes that may be used with the present invention include, but are not limited to, the Cisco 7200 and 7600 Series Routers available from Cisco Systems Incorporated, San Jose, Calif. For ease of illustration and description, the intermediate node 200 is illustrated on a generic hardware platform. However, in alternative embodiments, the intermediate node may contain a plurality of line cards which are interconnected with a route processing engine through a switching fabric (i.e., backplane logic and circuitry). Accordingly, those skilled in the art will appreciate that the depicted intermediate node 200 is merely exemplary and that the advantages of the present invention may be realized on a variety of different hardware platforms having various software capabilities.

The intermediate node 200 comprises one or more network interfaces 210, a processor 220, a memory controller 230 and a memory 240 interconnected by a system bus 280. Each network interface 210 may be a physical or logical interface that connects the intermediate node 200 with a neighboring network node in the routing area 100. Each network interface 210 may be adapted to transfer and acquire data packets 130 to and from various types of data links such as, e.g., Fast Ethernet (FE), Gigabit Ethernet (GE), wireless links, optical links, etc. Functionally, the interfaces 210 may be configured to communicate over their data links using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 240 comprises a plurality of storage locations that are addressable by the processor 220 and the network interfaces 210 via the memory controller 230. The memory 240 preferably comprises a form of random access memory (RAM) that is generally cleared by a power cycle or other reboot operation (e.g., it is a "volatile" memory). For instance, the memory 240 may comprise dynamic RAM (DRAM) and/or synchronous DRAM (SDRAM) storage locations adapted to store program code and data structures accessible to the processor 220. It will be apparent to those skilled in the art that the memory 240 also may comprise other memory means, including various computer-readable media, for storing program instructions and data structures pertaining to the operation of the intermediate node 200. Further, those skilled in the art will appreciate that at least some portions of the memory 240 may be embodied as electromagnetic signals that are transmitted from a remote memory element to the intermediate node 200.

The memory 240 stores, among other things, computer-readable instructions for implementing a routing operating system 250 that functionally organizes the intermediate node 200 by, e.g., invoking network operations in support of software processes and services executing on the processor 220. These services and processes may include various routing protocols 270, such as interior gateway routing protocols used to update routing information stored in the operating system's routing table 260. The operating system 250 renders forwarding decisions for received data packets 130 based on the contents of its routing table 260. The IOS™ operating system by Cisco Systems Incorporated is one example of an operating system 250 that may be stored in the memory 240 and executed in accordance with the illustrative embodiments herein.

The routing protocols 270 may include one or more link-state protocols, such as the OSPF or IS-IS protocol. Each link-state protocol may maintain a protocol-specific link state database 275 (LSDB) which is configured to store reachability information and various cost metrics associated with data links and network nodes in the routing area 100. In particular, the LSDB 275 may store dynamically measured node or link parameters and/or statically configured cost metrics for nodes and links in the routing area. The LSDB 275 also stores traffic engineering information and may incorporate the contents of a traffic engineering database (not shown). The routing protocols 270 may perform CSPF calculations based on the contents of their LSDBs 275 in combination with predetermined sets of criteria, e.g., selected by a system administrator. The lowest-cost repair path(s) identified by the resultant constrained shortest path(s) is/are forwarded by the routing protocols to the routing operating system 250. Then, the operating system may update its routing table 260 with newly-calculated repair paths that provide a sufficiently lower cost than the local repair path(s) currently being deployed.

In accordance with an illustrative embodiment, the present invention is implemented in a routing area 100 in which IGP advertisements are embodied as IS-IS link state packets (LSP). The IS-IS LSPs disseminate link state information using one or more type, length and value (TLV) tuples. For instance, an "Extended IS Reachability" TLV (type 22) is traditionally included in an LSP to advertise, among other things, various link metrics that may be used to compute local repair paths. These link metrics are often stored in sub-TLVs within the Extended IS Reachability TLV. The Extended IS Reachability TLV is generally described in more detail in RFC 3784, by H. Smit and T. Li, published June 2004, entitled "Intermediate System to Intermediate System (IS-IS) Extensions for Traffic Engineering (TE)" which is hereby incorporated by reference in its entirety.

Figure 3:
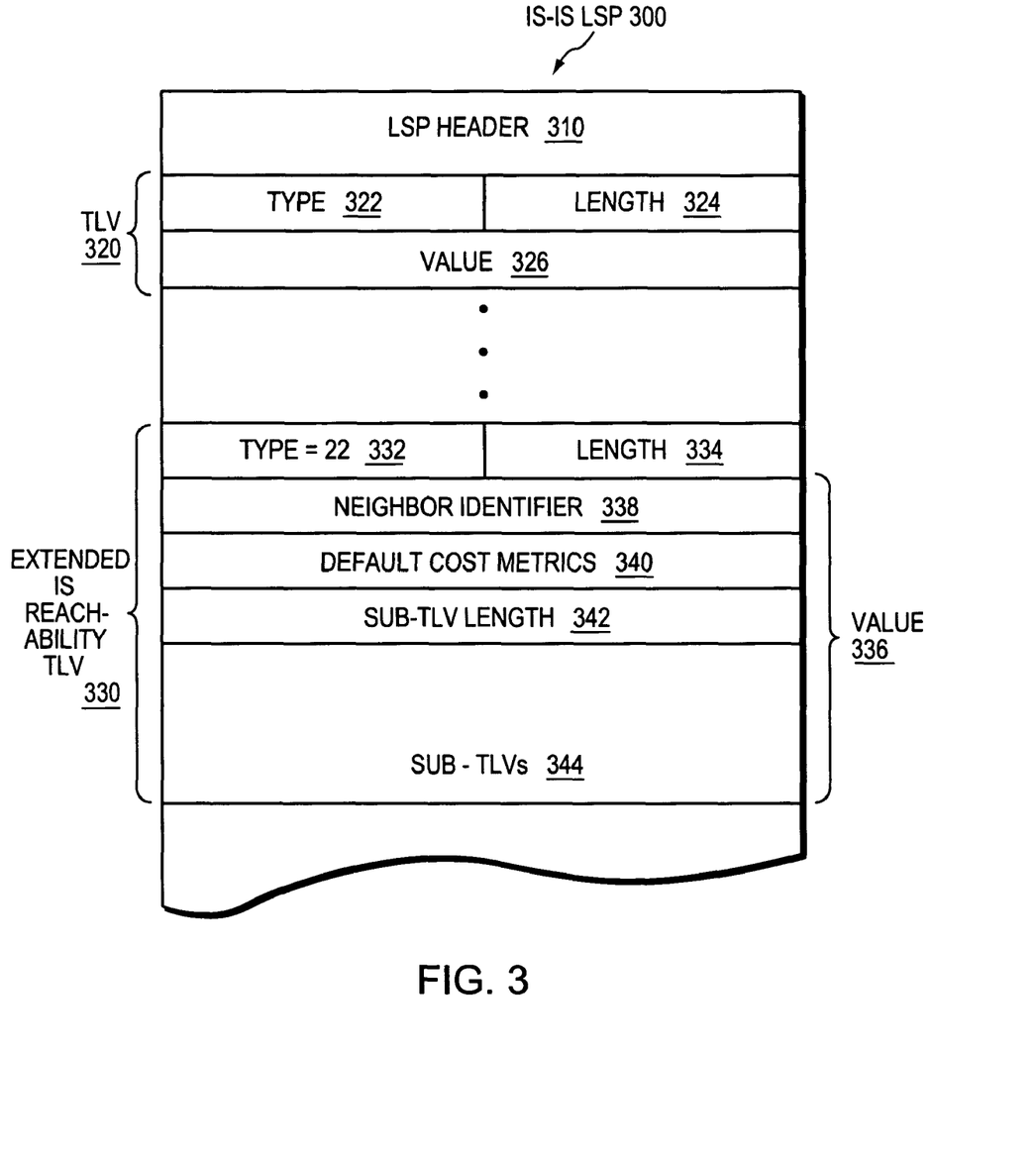
FIG. 3 is a schematic block diagram of an Intermediate-System-to-Intermediate-System (IS-IS) link state packet (LSP) that may be used to transport dynamically measured node or link parameter values in accordance with an illustrative embodiment of the invention.

FIG. 3 illustrates an exemplary IS-IS link state packet 300 that an intermediate node 200 may use to advertise dynamically measured node and/or link parameters in accordance with the illustrative embodiment. The LSP 300 comprises a conventional LSP header 310 and one or more TLV tuples 320. The LSP header 310 stores, among other things, the LSP's IS-IS version number, sequence number and relative "age" as well as authentication data and other packet-related information. Each TLV tuple 320 includes a type field 322, a length field 324 and a value field 326. The type field 322 indicates what type of information is stored in the value field 326. The length field 324 identifies the length, usually in octets, of the TLV 320. The value field 326 stores the specific value transported by the TLV.

The LSP 300 includes an Extended IS Reachability TLV 330, whose type field 322 equals 22 (as per RFC 3784) and whose length field 334 indicates the number of octets in the TLV 330. The Extended IS Reachability TLV's value field 336 includes, inter alia, a neighbor-identifier field 338, one or more default cost metrics 340, a sub-TLV length field 342 and zero or more sub-TLVs 344. The neighbor-identifier field 338 stores a value that identifies a reachable network node in the routing area 100. For instance, the identifier may comprise a system identifier and a pseudonode number, as described in more detail in the IS-IS protocol specification (RFC 1142). Each default cost metric value 340 typically corresponds to a statically-configured cost value that has been assigned, e.g., by a system administrator, to the network node identified in the neighbor-identifier field 338 or to one of the node's directly-connected data links. The Extended IS Reachability TLV 330 may contain zero or more sub-TLVs 344 that collectively span a number of octets specified in the sub-TLV length field 342.

Further to the illustrative embodiment, the sub-TLVs 344 are configured to store one or more dynamically measured node or link parameters. Preferably, these parameters are stored in a "Link Attribute" sub-TLV that is incorporated into the Extended IS Reachability TLV. The Link Attribute sub-TLV is described in more detail in the Internet Draft *draft-vasseur-isis-link-attr*-01.*txt*, published July 2004, entitled "Definition of an IS-IS Link Attribute sub-TLV," which is hereby incorporated by reference as though fully set forth herein.

Figure 4:
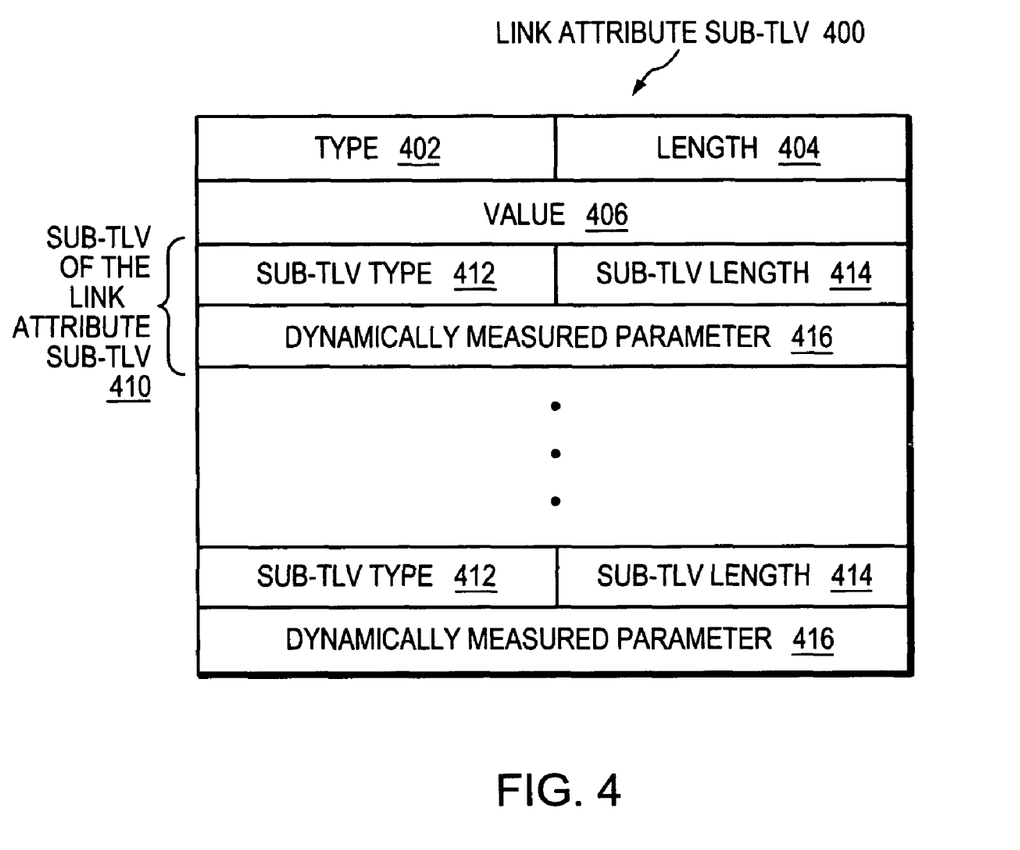
FIG. 4 is a schematic block diagram of an illustrative sub-type, length, value (TLV) tuple that may be configured to store one or more dynamically measured node or link parameter values in the IS-IS LSP of FIG. 3.

FIG. 4 illustrates an exemplary Link Attribute sub-TLV 400. The sub-TLV 400 comprises a type field 402, a length field 404, a value field 406 and one or more sub-TLVs 410. The type field 402 stores a value that identifies the sub-TLV 400 as a Link Attribute sub-TLV. The length field 404 stores the length, in octets, of the sub-TLV 400. The value field 406 may be configured to store information, such as flag values, associated with a data link identified in the Extended IS Reachability TLV 300; in some embodiments, the value field 406 may be omitted from the sub-TLV 400. Each sub-TLV 410 stores a sub-TLV type field 412, a sub-TLV length field 414 and a sub-TLV value field 416. The sub-TLV value field 416 is configured to store a dynamically measured node or link parameter. The sub-TLV type field 412 stores a value identifying the specific type of node or link parameter value that is stored in the field 416. The sub-TLV length field 414 stores the number of octets of the sub-TLV 410.

Figure 5:
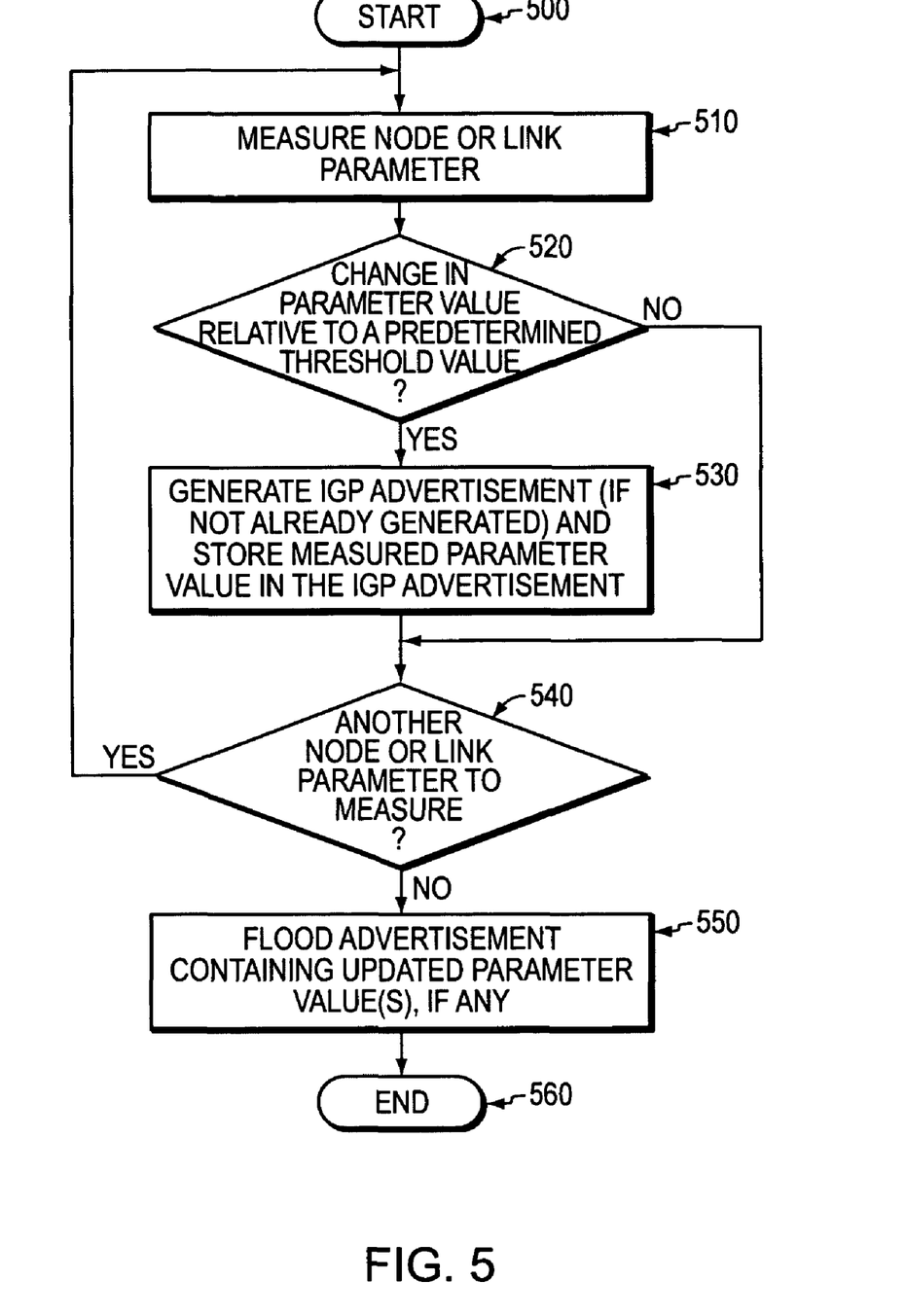
FIG. 5 is a flowchart illustrating a sequence of steps for flooding an interior gateway routing protocol (IGP) advertisement in accordance with the illustrative embodiment.

FIG. 5 is a flowchart illustrating a sequence of steps for dynamically measuring one or more node and/or link parameters at an intermediate node and advertising the dynamically measured parameters to other intermediate nodes in a routing area. The sequence starts at step 500 and proceeds to step 510 where the intermediate node 200 measures a node or link parameter. Next, at step 520, the intermediate node determines whether the measured node or link parameter has changed value relative to a predetermined threshold value that has been associated, e.g., by a system administrator, with the node or link parameter. The threshold value may be a predetermined percentage or amount, such that the intermediate node determines whether the measured node or link parameter has changed value by a larger percentage or amount than the threshold value. Alternatively, the intermediate node may determine, at step 520, whether the measured node or link parameter value is greater than or less than the predetermined threshold value.

If the intermediate node determines that the measured parameter value has not changed value relative to its associated predetermined threshold value, the sequence advances to step 540. On the other hand, if the dynamically measured value parameter value is determined to have changed relative to the threshold value, then at step 530 the intermediate node generates an IGP advertisement (if it has not already generated one) and stores the measured parameter value in the advertisement. Illustratively, the IGP advertisement is formatted as an IS-IS LSP 300, and the dynamically measured parameter value is stored in a Link Attribute sub-TLV 400 located within an Extended IS Reach-ability TLV 330 in the LSP 300.

At step 540, the intermediate node determines whether there is another node or link parameter to measure. If so, the sequence returns to step 510. Otherwise, at step 550, the IGP advertisement is flooded to other intermediate nodes in the routing area. Of course, those skilled in the art will understand that if, at step 520, none of the dynamically measured node or link parameters changed value relative to its associated predetermined threshold value, then an IGP advertisement is never generated at step 530 and thus flooding is not triggered at step 550. The sequence ends at step 560.

Figure 6:
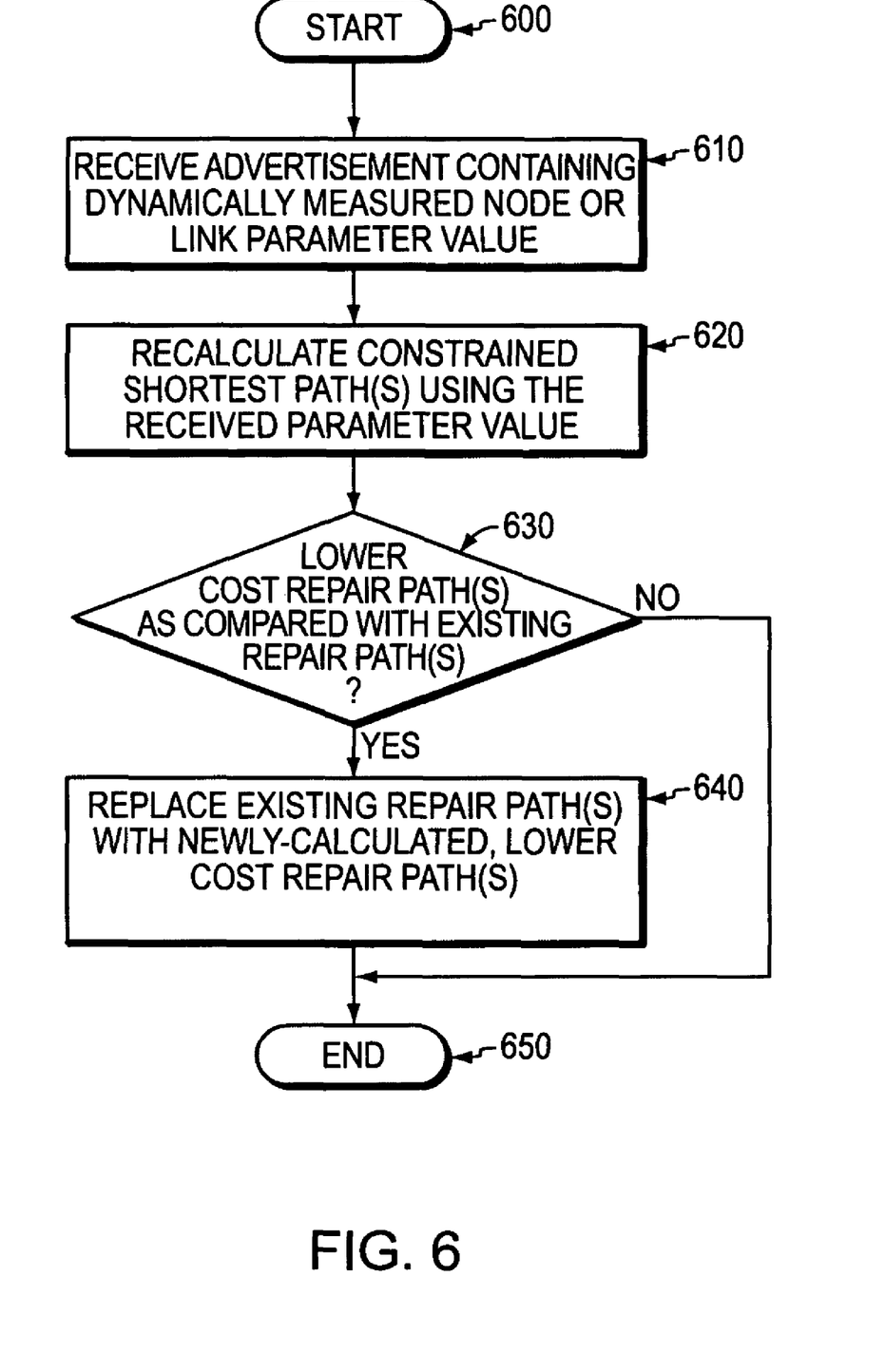
FIG. 6 is a flowchart illustrating a sequence of steps for determining whether an existing local repair path should be replaced with a lower-cost repair path in accordance with the illustrative embodiment of the invention.

FIG. 6 is a flowchart illustrating a sequence of steps for determining, in response to receiving a dynamically measured node or linked parameter value, whether an existing local repair path should be replaced with a lower-cost repair path. The sequence begins at step 600 and proceeds to step 610 where an IGP advertisement containing a dynamically measured node or link parameter value is received at a network interface 210 of an intermediate node 200. At step 620, the intermediate node inputs the received parameter value into its CSPF calculations and calculates one or more updated constrained shortest repair paths. Then, at step 630, the intermediate node determines whether the constrained shortest repair path(s) identifies any lower-cost repair path(s) as compared with existing local repair paths. Specifically, a lower-cost repair path is identified if its cost value is less than the cost value associated with a currently deployed local repair path by a predetermined percentage or amount. If no such lower-cost repair path can be identified, the sequence ends at step 650. Otherwise, at step 640, the intermediate node replaces existing repair path(s) with the newly-calculated, lower-cost repair path(s). The sequence ends at step 650.

Advantageously, the present invention optimizes local repair path calculations by taking into account dynamic measurements of link parameters that more accurately reflect the current state of the network. The invention may be used to compute optimized repair paths in accordance with various fast reroute (FRR) mechanisms, such as Multi-Protocol Label Switching (MPLS) or Internet Protocol (IP) FRR mechanisms. Although the invention is illustratively deployed in an IS-IS network, the invention is more generally compatible with any interior gateway routing protocol and does not depend on any particular network topology.

The foregoing has been a detailed description of illustrative embodiments of the invention. Various modifications and additions can be made without departing from the spirit and scope of the invention. For example, while the illustrative embodiment is deployed in an IS-IS-configured routing area, those skilled in the art will appreciate that the general principles described herein are equally applicable using other IGP protocols, such as the OSPF protocol. Further, the IS-IS LSP 300 is merely one example of an IGP advertisement that may be adapted to transport dynamically measured node or link parameters in accordance with the present invention; other IGP advertisement formats and protocols also may be used to the same effect.

It is expressly contemplated that the teachings of this invention can be implemented as software, including a computer-readable medium having program instructions executing on a computer, hardware, firmware, or a combination thereof. Thus, the inventive technique therefore may be implemented in various combinations of hardware and/or software. Accordingly, this description is meant to be taken only by way of example and not to otherwise limit the scope of the invention.

What is claimed is:

1. A method for dynamically updating local repair paths in a computer network, the method comprising:
   dynamically measuring a parameter value associated with a network node or data link in the computer network, the parameter value being a changing value;
   determining whether the measured parameter value crosses a predetermined threshold value;
   disseminating the measured parameter value in the computer network if the measured parameter value crosses the predetermined threshold value; receiving the disseminated measured parameter value at one or more other network nodes;
   recalculating, at the one or more other network nodes, a lowest-cost local repair path with a constraint-based shortest path first (CSPF) algorithm using the received measured parameter value, the lowest-cost local repair path having a cost value that is based upon the received dynamically measured parameter value;
   determining whether the calculated lowest-cost repair path is an acceptable replacement repair path for a currently deployed local repair path, the recalculated lowest-cost local repair path considered an acceptable replacement repair path if the cost value associated with the recalculated lowest-cost local repair path is less than a cost value associated with the currently deployed local repair path by a predetermined percentage or amount; and
   replacing the currently deployed local repair path with the calculated lowest-cost local repair path in response to determining that the calculated lowest-cost local repair path is an acceptable replacement repair path.

2. The method of claim 1, wherein the step of disseminating the measured parameter value further comprises:
   storing the measured parameter value in an interior gateway routing protocol (IGP) advertisement; and
   flooding the IGP advertisement in the computer network.

3. The method of claim 2, wherein the IGP advertisement is an Intermediate-System-to-Intermediate-System (IS-IS) link state packet (LSP).

4. The method of claim 3, wherein the IS-IS LSP stores the measured parameter value in a Link Attribute sub-type, length, value (TLV) tuple of an Extended IS Reachability TLV transported in the IS-IS LSP.

5. A network node, comprising:
   a processor;
   a network interface configured to receive an advertisement from another network node; and
   a memory configured to store instructions which are executable by the processor to:
      receive the advertisement at the network interface, the advertisement containing a dynamically measured parameter value, the parameter value being a changing value that has crossed a predetermined threshold value;
      recalculate a lowest-cost local repair path with a constraint-based shortest path first (CSPF) algorithm using the received dynamically measured parameter value, the lowest-cost local repair path having a cost value that is based upon the received dynamically measured parameter value;
      determine whether the recalculated lowest-cost local repair path is an acceptable replacement repair path for a currently deployed local repair path, the recalculated lowest-cost local repair path considered an acceptable replacement repair path if the cost value associated with the recalculated lowest-cost local repair path is less than a cost value associated with the currently deployed local repair path by a predetermined percentage or amount; and
      replace the currently deployed local repair path with the recalculated lowest-cost repair path in response to determination that the recalculated lowest-cost repair path is an acceptable replacement repair path.

6. A method comprising:
   deploying a local repair path that protects at least one of a protected link and a protected node in a computer network;
   receiving an advertisement on a network interface, the advertisement containing a dynamically measured parameter value that describes resources associated with a link or node in the computer network that may be used in a local repair path, the advertisement received at the network interface when the parameter value crosses a predetermined threshold value;
   in response to receiving the advertisement, recalculating a lowest-cost local repair path that protects at least one of the protected link and the protected node with a constraint-based shortest path first (CSPF) algorithm using the received dynamically measured parameter value, the lowest-cost local repair path having a cost value that is based upon the received dynamically measured parameter value;
   determining whether the recalculated lowest-cost local repair path is a preferable repair path to a currently deployed local repair path, wherein the determining considers the recalculated lowest-cost local repair path as a preferable repair path if the cost value associated with the recalculated lowest-cost local repair path is less than a cost value associated with the currently deployed local repair path by a predetermined percentage or amount; and
   replacing the currently deployed local repair path with the recalculated lowest-cost local repair path in response to determining that the recalculated lowest-cost local repair path is a preferable repair path to the currently deployed local repair path.

7. The method of claim 6, wherein the advertisement containing the dynamically measured parameter value is an interior gateway routing protocol (IGP) advertisement.

8. The method of claim 7, wherein the IGP advertisement is an Intermediate-System-to-Intermediate-System (IS-IS) link state packet (LSP).

9. The method of claim 8, wherein the IS-IS LSP stores the measured parameter value in a Link Attribute sub-type, length, value (TLV) tuple of an Extended IS Reachability TLV transported in the IS-IS LSP.

10. An apparatus comprising:
    means for deploying a local repair path that protects at least one of a protected link and a protected node in a computer network;
    means for receiving an advertisement, the advertisement containing a dynamically measured parameter value that describes resources associated with a link or node in the computer network that may be used in a local repair path, the advertisement received when the parameter value crosses a predetermined threshold value;
    means for recalculating a lowest-cost local repair path that protects at least one of the protected link and the protected node with a constraint-based shortest path first (CSPF) algorithm using the received dynamically measured parameter value, the lowest-cost local repair path having a cost value that is based upon the received dynamically measured parameter value;
    means for determining whether the recalculated lowest-cost local repair path is a preferable repair path to a currently deployed local repair path, wherein the means for determining considers the recalculated lowest-cost local repair path as a preferable repair path if the cost value associated with the recalculated lowest-cost local repair path is less than a cost value associated with the currently deployed local repair path by a predetermined percentage or amount; and
    means for replacing the currently deployed local repair path with the recalculated lowest-cost local repair path in response to determining that the recalculated lowest-cost local repair path is a preferable repair path to the currently deployed local repair path.

11. The apparatus of claim 10, wherein the advertisement containing the dynamically measured parameter value is an interior gateway routing protocol (IGP) advertisement.

* * * * *